United States Patent Office 2,736,813
Patented Feb. 28, 1956

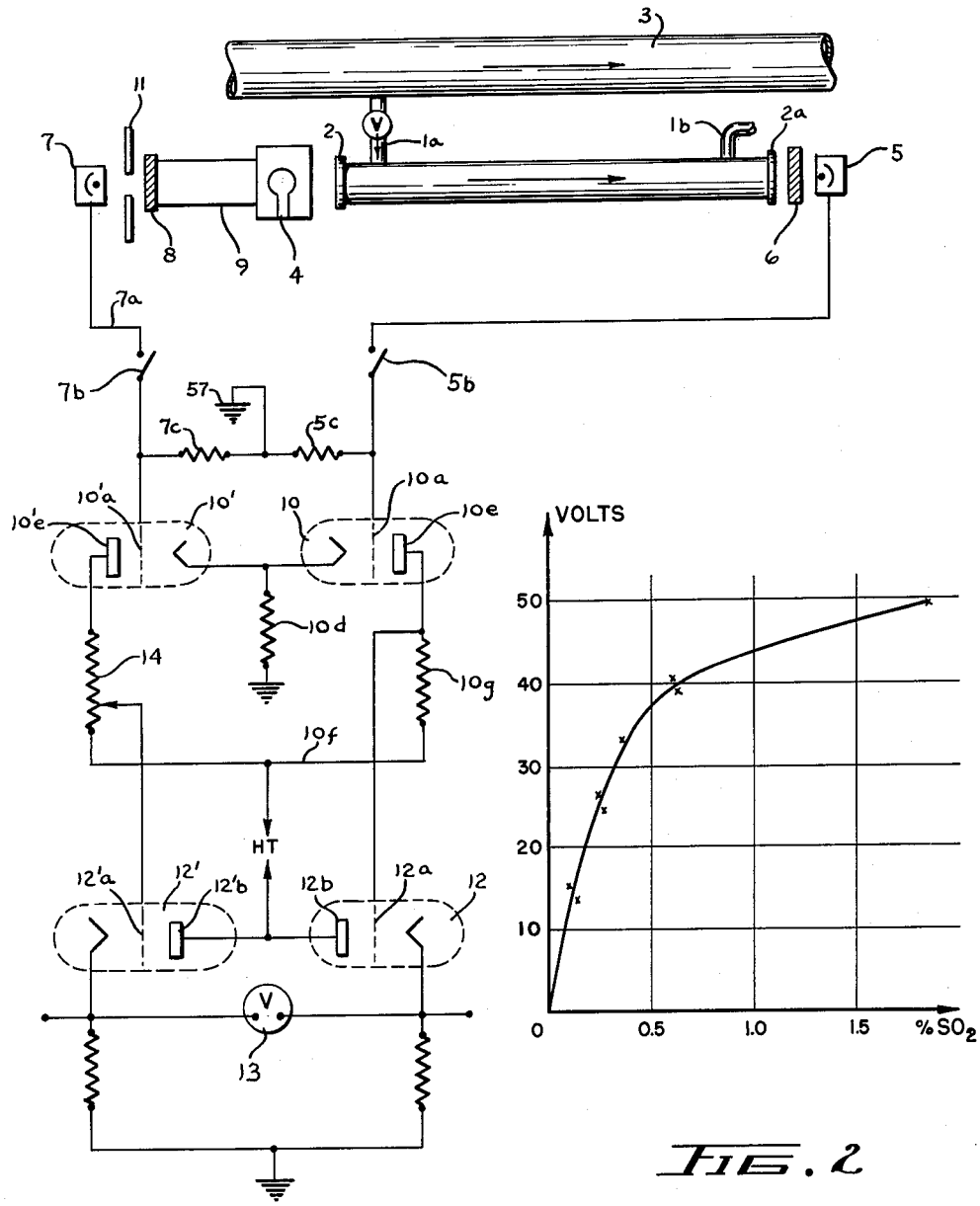

2,736,813

GAS ANALYSIS

Claude Michel Cherrier, Saint-Mande, France, assignor to Societe Anonyme des Manufactures des Glaces et Produits Chimiques de Saint-Gobain, Chauny & Cirey, Paris, France Application March 5, 1952, Serial No. 274,999

15 Claims. (Cl. 250—43.5)

This invention relates to the qualitative and quantitative analysis of gas by means of a ray of light electronically recorded. The invention relates more particularly to the instantaneous qualitative and quantitative determination of sulphur dioxide, in a gas mixture.

In many industrial processes, it is necessary to know the content of sulphur dioxide in a number of mixed gases which may be either starting materials or waste gases or fumes.

Ordinary methods of analysis are not continuous and are hence, imperfect. There is a necessity for an apparatus which will continuously and accurately signal the presence of sulphur dioxide and its quantity, setting off an alarm of sight or sound, or operating controlling apparatus, when the percentage of this particular gas reaches a predetermined value.

It is an object of this invention to construct such an apparatus, employing light for analysis and electronic means for signalling. The process is based upon a photoelectric method which includes in its principles illuminating a photoelectric cell by a light ray traversing a tube containing the gaseous mixture to be analysed, employing the current emitted by the photoelectric cell to operate electronic amplifier power stage and signalling means in accordance with the quantity of the sulphur dioxide gas in the mixture undergoing analysis. The principles will be better understood after a consideration of the hereinafter described apparatus applied to the determination of sulphur dioxide in a gaseous mixture.

According to the process of the invention, the analysis for $SO_2$ is carried out by using the spectrum absorption bands of $SO_2$ which are found in the ultra-violet and which occupy the intervals of wave length from 3050 to 3200 A. and that which is found between 2650 and 2850 A. For this purpose, the source of light must give ultra-violet light and a high pressure mercury vapor lamp is satisfactory for the purpose; that light gives ultra-violet light of relatively high intensity in the spectrum bands indicated. The photoelectric cells are chosen because of their response in these spectrum bands.

In the accompanying drawing;

Fig. 1 represents a schematic view of the apparatus including wiring diagram;

Fig. 2 is a graph of the results obtained by apparatus of this type analyzing a flowing gas for the presence of $SO_2$ and showing the relation of volts to percentages in the range from 0 to 50 volts and 0 to about 2%.

The apparatus of Fig. 1 comprises a high pressure mercury vapor lamp 4 which directs its rays in opposite directions to photoelectric cells 5 and 7. The photoelectric cells are preferably of identical performance characteristics. An analyzer tube 1 is placed between the lamp 4 and the cell 5. It is closed at both ends by means of transparent plates, for instance, quartz plates 2 and 2a. Tube 1 is connected by a conduit 1a and valve V to a pipe 3 which carries the gas which is to be analyzed for the presence of $SO_2$. At the opposite end, the tube has a discharge conduit 1b. By opening the valve V, the gas in the pipe is permitted to flow through the analyzer tube 1, where it is subjected to analysis by the ultra-violet light emitted by tube 4. The photoelectric cell 5 is sensitive in the wave lengths of light which include an absorption band of $SO_2$. In the present instance, it will be assumed that this cell is sensitive in a range which includes the absorption band of 3050 to 3200 A.

An optical filter, for example, a silver filter prepared as hereinafter described, is interposed between the end of the tube and the cell 5, if desired.

The other cell 7 is present in order to avoid the effects of those fluctuations which are apparently unavoidable in mercury vapor lamps. This differential method disposes the tube of comparison 7 to receive the rays of the lamp 4 through a tube 9 and the filter 8 similar to filter 6. Diaphragm 11 having a variable opening, permits the control of the quantity of light received by the cell 7, prevents overheating the cell and consitutes one method of balancing the circuits hereinafter described. The tubes 1 and 9 may conveniently be of glass, either transparent or opaque, but other materials are useful so long as they are inert to the gases which are present in tube 1. The photoelectric cell 5 is connected, as diagrammatically shown on the drawing by line 5a, in which is a switch 5b, to the grid 10a of triode tube 10. The cell 7 is connected by line 7a through switch 7b to the grid 10'a of triode 10'. The lines 5a and 7a are connected to ground 57 through resistances 7c and 5c. The cathodes of tube 10' are connected together and to ground through resistance 10d. The plates 10e and 10'e of the two tubes are connected to the grids 12a, 12'a respectively, of tubes 12, 12', the tube 10' being connected through a potentiometer 14 which permits the balancing of the system and the regulation of the signalling means to zero. The potentiometer 14 is connected by line 10f and resistance 10g to the plate 10e of tube 10, both plates of this balanced amplifier being supplied with high tension direct current through line 10f.

The balance power stage includes triode tubes 12 and 12' the grids of 12a and 12'a of which are supplied from the amplifiers 10'. The plates 12b, 12'b of these tubes are connected together and are supplied with high tension direct current. The cathodes of these tubes are connected to opposite poles of signalling apparatus 13 which in this case is shown as a measuring voltmeter. Other types of measuring and recording apparatus such as alarm relays and recording voltmeters can be connected in parallel to voltmeter 13. The cathodes of tubes 12, 12' are grounded through resistances located beyond the connections of voltmeter 13. The device operates as follows:

Before the analysis begins, the tube 1 is filled with air, as in tube 9 and the needle of voltmeter 13 is brought to zero by adjusting the potentiometer 14, or by adjusting the diaphragm 11 or by adjusting both of them. Thereafter, the valve V is opened allowing gas from the main 3 to flow through the tube. The light emitted by lamp 4 is reduced before it reaches cell 5 by absorption in the $SO_2$ in the gas, if any is present. If none is present, the light still reaches the cell 5 substantially unaffected and no change shows on the voltmeter 13. However, if $SO_2$ is present, the light reaching the cell 5 is varied by absorption in the $SO_2$, while the light reaching tube 7 is unaffected. This produces an unbalanced discharge from the cathodes of tubes 12, 12' and operates the needle of the voltmeter 13 in proportion to the amount of $SO_2$ present in the gas in the tube.

By flowing different gases of known $SO_2$ constitution through the tube, a precisely accurate analytical graph such as shown in Fig. 2, may be established and the content of $SO_2$ can be read thereafter directly from the volts shown on the voltmeter scale.

A single stage of amplification is shown, but as many stages may be employed as desired.

When a relay is connected to parallel voltmeter 13, it may be set to operate at a power of 20 mw., for example, for a given small quantity of gas.

The symmetrical arrangement indicated in the drawing eliminates certain surges of output voltage due for example, to alteration in the heating of the tubes.

The variable potentiometer 14 permits the equalization and balancing of the currents emitted by the power stage and the setting of the signalling apparatus to zero, and the diaphragm 11 accomplishes the same result by equalizing the photoelectric currents of cells 5 and 7.

The analytical tube 1 is of different lengths for different quantities of gas. For example, a short tube would contain only an extremely limited quantity of $SO_2$ in a gas of low $SO_2$ percentage, conceivably incapable of establishing an absorption band. Consequently, for low percentages of gas the tube should be longer than when the gas is present in substantial amounts. For example, a tube 75 cm. long permits accurate analysis of $SO_2$ percentages between .01 and 1.0. The curve of Fig. 2 shows the relation of the output voltage to the $SO_2$ content in a tube of 75 cm. length.

This curve shows the great accuracy which is provided between .01 and .5% $SO_2$.

The accuracy decreases beyond that point.

With a tube of only 10 cm. length, percentages between 5 and 10% of $SO_2$ can be accurately determined.

In order to increase the sensitivity of the apparatus, an optical filter can be interposed between the source of light and the analytical tube; such a filter is shown at 6 between the light 4 and the cap 2; such filters are constructed to allow the passage of only those wave lengths which correspond to the absorption bands employed. When the filter 6 is adjacent lamp 4, the filter 8 should be similarly placed. When the absorption bands employed are in the range 3050 to 3200 A., the filter may be constituted of a thin layer of silver deposited on a plate transparented to ultra-violet rays, for instance, a quartz plate; the silver deposit can be made in any known way, for example, by distilling silver under vacuum, by cathodic evaporation, and by chemical or electro-chemical deposition, to cite several exemplary methods. The optical characteristics of these filters differ according to the thickness of the silver deposited upon them; one should choose the most appropriate, taking into consideration the accuracy required and the mean value of $SO_2$ anticipated in the flowing gases. The thicker the silver deposit, the narrower the wave lengths transmitted. In order to protect the silver layer for longer use, it is advisable to enclose it between two quartz plates.

When the absorption band between 2650 and 2850 A. is used, the filter may be advantageously comprised of a deposit of potassium on a plate transparent in that region of the spectrum, for instance, quartz. It is equally possible to employ liquid filters of Christiansen type constituted by a suspension of quartz in a mixture of cyclohexane and decahydronaphalene.

The apparatus hereinabove described includes a source of ultra-violet light, an analyzer tube provided with a filter which passes only those light waves which correspond to the band or bands of absorption used, two photoelectric cells of which one is illuminated directly and the other through the gas being analyzed, these cells being connected in electrical opposition and the differential of their current being amplified by D. C. through one or several stages, and a power stage including two cathode followers supplying signalling apparatus.

As many apparently widely different embodiments of the present invention may be made without departing from the spirit and scope thereof, it is to be understood that the invention is not limited to the specific embodiments.

What is claimed is:

1. The method of analyzing a gas for $SO_2$ that comprises passing light, having a wave length corresponding to that of a spectrum absorption band of $SO_2$ in ultra-violet, by one path to a photoelectric cell, passing identical light by another path to another such cell, activating balanced amplifiers by the current from said cells, directing the output of said amplifiers to balanced signalling apparatus, admitting the gas to be analyzed to one said path only, and determining the presence of $SO_2$ by the signal of the signalling apparatus.

2. The method of claim 1 in which the current emitted by the said cells is regulated by means of an adjustable diaphragm placed before the said another cell.

3. The method of claim 1 in which the current emitted by the said cells is regulated by means of a variable potentiometer in the circuit of one of them.

4. The method of claim 1 in which the said light has a wave length in the band of 3050 to 3200 A.

5. The method of claim 1 in which the said light has a wave length in the band at 2650 to 2850 A.

6. The method of claim 4 in which the light is obtained by interposing before an ultraviolet lamp, an optical filter constituted by a thin layer of silver deposited on a plate transparented to ultraviolet rays.

7. The method of analyzing a gas for $SO_2$ that comprises passing light having a wave length in one of the ranges of 2,650–2,850 A. and 3,050–3,200 A. through different paths to photoelectric cells connected in electrical opposition, conducting the output of said cells to respective parts of a D. C. balanced amplifier, conducting the output of said amplifier to respective parts of a power stage, conducting the output of the power stage to a balanced signalling means, and activating the signalling means by passing gas containing $SO_2$ through one only of said paths.

8. In the method of claim 7, supplying the said amplifier with high tension D. C. current.

9. In the method of claim 8, supplying the said power stage with high tension D. C. current.

10. The method of analyzing a gas for $SO_2$ that comprises passing ultra-violet light through a filter consisting in its light filtering part of a translucent layer of a metal from the group consisting of silver and potassium and through a space adapted to be filled by the gas to be analyzed for $SO_2$, generating an electric current by the light that passes through and emerges from said space, establishing a value for said current, admitting the gas to be analyzed to said space, and comparing the value of said current with the value originally established.

11. The method of analyzing a gas for $SO_2$ that comprises passing ultra-violet light through a filter consisting in its light filtering part of a translucent layer of a metal from the group consisting of silver and potassium and through a space adapted to be filled by the gas to be analyzed for $SO_2$, generating an electric current by the light that passes through and emerges from said space, passing ultra-violet light from the same source through a similar filter, generating another electric current thereby, amplifying said current, amplifying said another current, balancing the amplified currents and delivering each said current to balanced power stages, admitting the gas to be analyzed to said space, and activating signalling apparatus by the outputs of the power stages.

12. The method of claim 1 in which the light is obtained by interposing before an ultra-violet lamp an optical filter constituted by a translucent layer of potassium deposited on a plate transparent to ultra-violet light.

13. The method of analyzing a gas for $SO_2$ that comprises generating ultra-violet light in a wave length substantially limited to that of an absorption band of $SO_2$ in the ultra-violet portion of the spectrum, passing said light through a space adapted to contain the gas, generating an electric current thereby, passing the gas through the space, and comparing the current generated in the presence of the gas with that generated in its absence.

14. The method of generating light capable of use in analyzing gas for $SO_2$ by spectrum absorption methods that comprises passing ultra-violet light through a filter consisting essentially of a layer of one of the metals consisting of silver and potassium.

15. The method of analyzing a gas for $SO_2$ that comprises passing ultra-violet light through a filter consisting essentially of a thin layer of one of the metals consisting of silver and potassium and through the gas to be analyzed, passing the same beam from the filter through a like space known to be free of such gas, generating a current of electricity by means of such light and comparing the current generated during the presence of gas to be analyzed with that generated during the absence of such gas.

References Cited in the file of this patent

UNITED STATES PATENTS

| Number | Name | Date |
|---|---|---|
| 1,971,317 | Sheldon et al. | Aug. 21, 1934 |
| 2,323,128 | Hare | June 29, 1943 |
| 2,382,381 | Calvert et al. | Aug. 14, 1945 |
| 2,389,046 | Hare | Nov. 13, 1945 |
| 2,395,489 | Major et al. | Feb. 26, 1946 |
| 2,403,631 | Brown | July 9, 1946 |
| 2,411,672 | Van Den Akker | Nov. 26, 1946 |
| 2,501,599 | Eltenton | Mar. 21, 1950 |
| 2,519,081 | Skarstrom | Aug. 15, 1950 |
| 2,554,321 | Bray | May 22, 1951 |
| 2,570,064 | Meinert | Oct. 2, 1951 |
| 2,591,737 | Souther, Jr. | Apr. 8, 1952 |